July 10, 1962  E. F. WARD  3,043,968
FLUID COOLED ELECTRICAL MACHINE
Filed June 19, 1959  2 Sheets-Sheet 1

ELMER F. WARD
INVENTOR

BY White & Haefliger
ATTORNEYS

July 10, 1962  E. F. WARD  3,043,968
FLUID COOLED ELECTRICAL MACHINE
Filed June 19, 1959  2 Sheets-Sheet 2

ELMER F. WARD
INVENTOR

BY *White & Haefliger*

ATTORNEYS

United States Patent Office 3,043,968
Patented July 10, 1962

3,043,968
FLUID COOLED ELECTRICAL MACHINE
Elmer F. Ward, Orange, Calif., assignor to The Task Corporation, Anaheim, Calif., a corporation of California
Filed June 19, 1959, Ser. No. 821,610
10 Claims. (Cl. 310—54)

This invention relates generally to fluid cooled electrical machinery, and more particularly has to do with improvements in the construction of high speed electrical motors as respects fluid passages in and around the motor rotor and stator assemblies, and the rotor shaft, seals and bearings therefore, providing for circulation and confinement of fluid in different cooling regions of the motor, all for the purposes of promoting maximum cooling and efficiency thereof.

Speaking generally with respect to the design and operation of high speed electrical machinery, and particularly motors, it is found that their upper speed and load limits are governed by limitations of heat transfer from the stator and rotor assemblies. It is found that the inability to transfer heat from, or cool, the rotor and stator at sufficient rates causes excessive heating, and that the rotor and stator temperatures must be controlled or kept below certain predetermined maxima so as to prevent burn-out of the motor. In conventional electric motors having coolant jacket surrounding the stator assemblies, these heat losses in the end turns of the stator winding must be transferred to the stator iron and then to the jacket, which is cooled by fluid circulation in confined spaces within the jacket. And, the rotor assembly normally can get rid of its heat only by transfer to the bearings or by radiation to the stator. Accordingly, speed and load limitations of high speed motors are primarily governed by heat transfer rates from the stator and rotor assemblies.

It is a major object of the present invention to provide improvements in fluid cooling of electrical motors and particularly rotor and stator assemblies, for the purpose of promoting more effective cooling and hence raising the speed and load limits of a given size motor. The invention contemplates in its broadest aspects the provision of a fluid cooled electrical machine comprising means including a housing and rotor and stator assemblies within the housing, these assemblies having a gap therebetween, said means forming a passage for circulating cooling fluid within the housing and in direct contact with the rotor and stator assemblies, and said means also forming a relatively restricted opening communicating between the coolant passage and the gap for restricting egress of fluid from the gap while permitting limited access of fluid to the gap from the passage. As a result, fluid confined within the gap efficiently absorbs heat from the rotor to cool the latter, and the temperature of the gap fluid is kept relatively high to effect a substantial decrease in the gap fluid viscosity. For example, fluid in the gap may become vaporized by heat absorption from the rotor exterior and stator interior, for "vapor cooling" these areas.

Tests have shown that confinement of the fluid in the gap results in much more effective heat transfer from the rotor to the stator and then from the stator to fluid circulating over the exterior of the stator, the latter circulating fluid being at a lower temperature than the confined fluid in the gap. Also there is very little drag on the rotor by virtue of confinement of fluid in the gap, and the rotor operates for all intents and purposes as if it were rotating in air after the fluid in the gap becomes vaporized. Actually, there is substantial improvement at all temperatures because the volume of the confined fluid is small, and reaches high temperature quickly, with lowered viscosity. In particular, the invention contemplates the use of a light oil coolant, the temperature of which increases during its confinement in the gap to, say 400° F. Also, a high vapor pressure fluid capable of evaporating in the gap under operating conditions is extremely useful, since utilization is made of its latent heat of vaporization to absorb heat from the rotor while the fluid remains at the same temperature and vaporizes. The vapor bubbles then slowly discharge from the gap through the restricted entrances to the gap and then into the circulating liquid coolant outside the gap, where the bubbles collapse and give up their latent heat to the circulating fluid. During vapor phase operation, most evaporation appears to take place at the "end rings" of the rotor. The "end ring" is the conductor which connects the ends of all the rotor bars in an induction motor, these bars usually comprising copper or aluminum. Thus, the heat transfer from the rotor to bars and to the end rings is very rapid and efficient. The invention contemplates the use of different evaporative type coolants such as certain volatile petroleum derivatives, typically gasoline. Another usable coolant comprises a liquid known as JP-4.

Another object of the invention is to provide for confinement of the coolant in the gap and circulation of fluid in passages outside the gap, through the use of leaking seals forming with the rotor shaft openings communicating between the liquid circulation and the gap for restricting egress of fluid from the gap while permitting limited access of fluid to the gap from the circulation passage. As will be described, the leaking seals are preferably located at axially opposite ends of the rotor assembly and are preferably integral with rotor bearings, the seals and bearings forming annular ports communicating between the liquid circulation passage and the restricted openings or entrances to the gap at opposite ends of the rotor assembly.

These and other objects and advantages of the invention, as well as the details of an illustrative embodiment, will be more fully understood from the following description of the drawings, in which.

Figure 1:
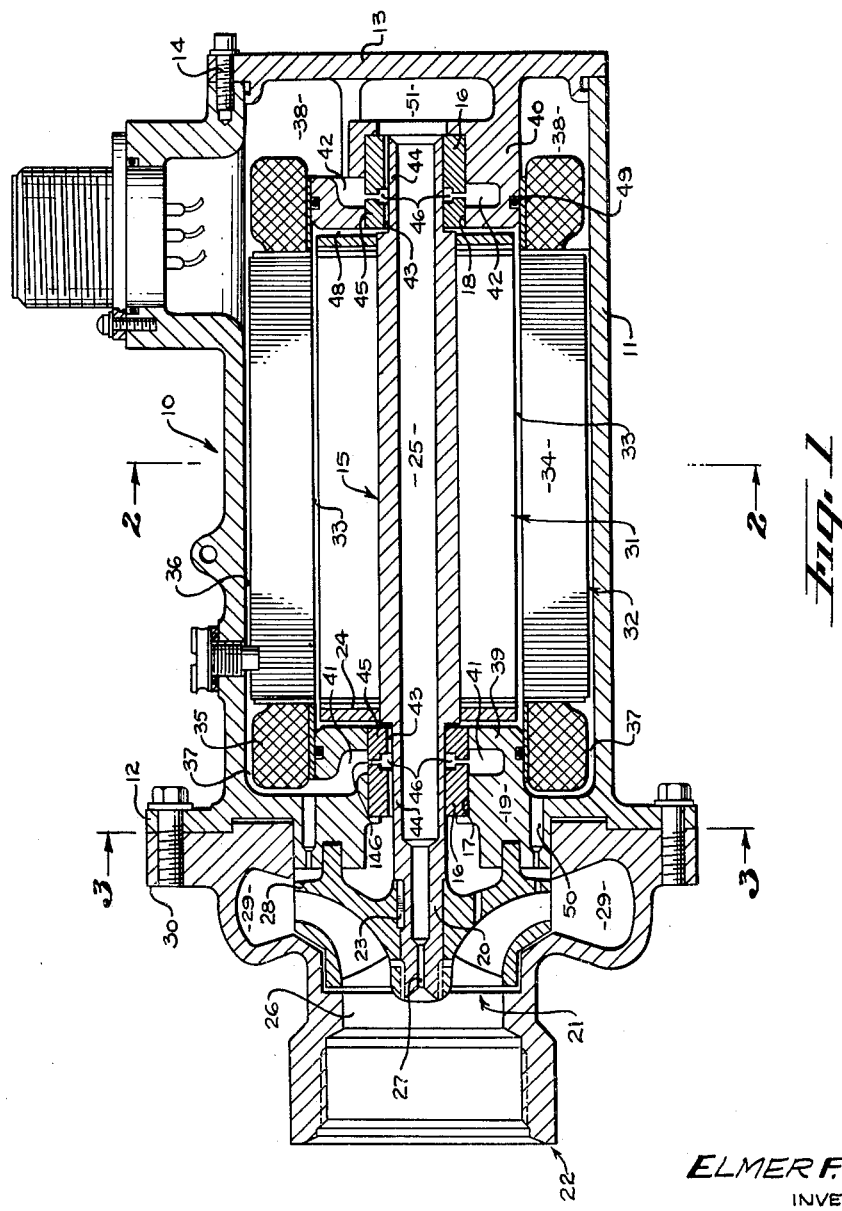
FIG. 1 is an elevation taken in section through the electrical motor and pump combined therewith.
Figure 2:
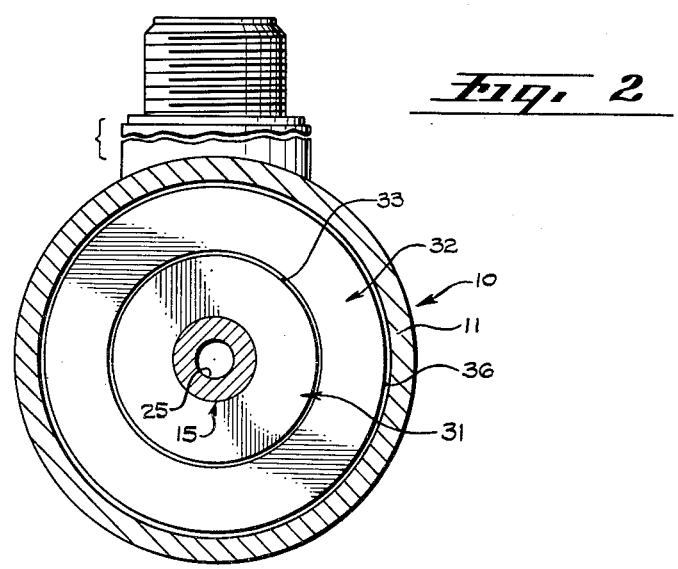
FIG. 2 is a section taken on line 2—2 of FIG. 1.
Figure 3:
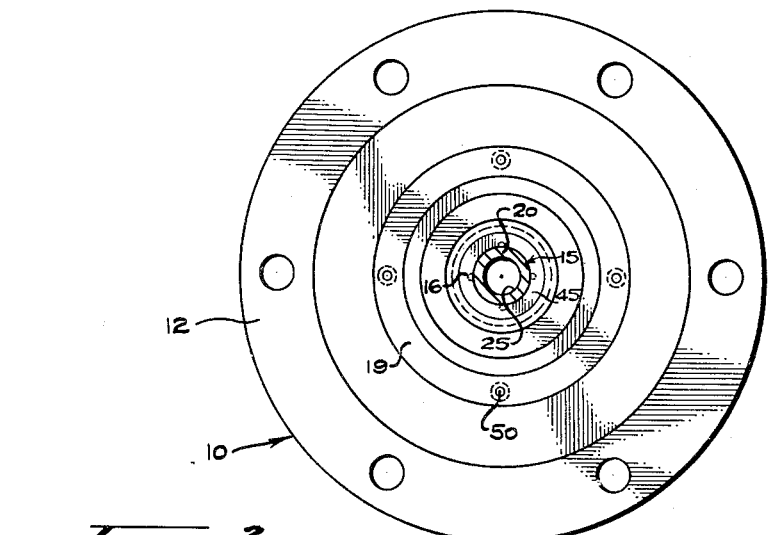
FIG. 3 is a section taken on line 3—3 of FIG. 1.

In the drawings, the motor housing generally indicated at 10 includes a receptacle 11 having a flange 12 at one end thereof and a cap 13 closing the opposite end of the receptacle, the cap being connected thereto at 14. Extending axially within the housing 10, is a rotor shaft 15 journaled in sleeve bearings 16 respectively centered in bores 17 and 18 of the housing, the shaft projecting through the closed end wall 19 at 20. The projecting end 20 of the rotor shaft is connected in driving relation with an impeller 21 within a pump housing assembly 22, the connection being made through a key 23. The rotor shaft 15 is tubular and its bore 25 is in communication with the eye 26 of the impeller through a drilled passage 27 extending axially through the shaft end 20, and also through the impeller. As will be described, liquid coolant is drawn through the tubular rotor shaft 15 and into the eye of the impeller for subsequent outer radial discharge by the impeller vanes 28 into the pump volute 29. The pump housing assembly 22 has a mounting flange 30 bolted to the flange 12 of the motor housing.

Carried by the rotor shaft 15 intermediate the bearings 16 is an iron core 31, the laminations of which typically extend in perpendicular planes. A series of circularly spaced conductor bars, not shown, are received or sunk in the core forming the squirrel cage associated with induction motors, there being annular end rings 24 opposite ends of the rotor and joined with the conductor bars.

The stator 32 extends concentrically about the rotor to form a thin annular gap 33 therebetween. The stator includes an elongated laminar core 34 containing openings, not shown, through which the stator windings extend in an axial direction, the windings at opposite ends of the core being shown as rings 35. These together with the stator 32 are inwardly spaced at 36 from the housing 11 to form an annular liquid coolant circulation passage or space 36 through which the coolant flows in intimate cooling relation with the stator periphery. The winding rings 35 extend generally in the annular spaces 37 and 38 formed at axially opposite ends of the rotor and stator assemblies, these spaces also communicating with the housing bosses 39 and 40 in which the bearings 16 are journaled.

The bosses 39 and 40 furthermore contain annular passages or cavities 41 and 42 in which the fluid coolant is received for communicating fluid pressure to the gap 33 through restricted openings or clearances 43 between the reduced diameter portions 44 of the rotor shaft and annular seals 45 carried by the bosses 39 and 40. As shown, each seal 45 is integral with a bearing 16, the seal and bearing sleeve being slotted at 46 intermediate the opposite ends of the sleeve, the slot intersecting the entire sleeve and seal bore to form an annular port communicating between the restricted openings 43 and the cavities or passages 41 and 42 through small openings 146. Thus, fluid pressure is typically communicated at the left end of the rotor and stator assembly as shown, from circulation passage 37, through cavity 41 and slot or port 46, to the openings 43, and then to the gap 33 between the rotor and stator, necessary thin annular clearance 48 between the rotor 31 and the boss 39 being provided to permit fluid access to the gap 33. Typically, but not necessarily, the integral seal and bearing are made of carbon and are stationary, the electrical machine therefore having no rotary seals. Annular seals 49 are provided between the peripheries of the bosses 39 and 40, and the stator windings 35 to seal off escape of fluid from the gap 33 between these components.

In operation, fluid coolant is bled off from the pump volute 29 through an orifice 50 in the pump housing into the circulation passage 37, and the fluid then circulates over the stator through passage 36 and into the opposite end passage 38. From there the fluid circulates into a central passage 51 in the cap 13 and enters the hollow rotor shaft 15 from where the fluid is returned or drawn into the eye of the impeller as previously described. For all practical purposes the pressure of the fluid in the end passages 37 and 38 is the same, so that the fluid pressure is communicated through cavities 41 and 42, ports 46, openings 43 and clearances 48, to the gap 33, thereby confining fluid in the gap by equal and opposite pressure exertions at opposite ends of the gap.

This confined fluid consequently is heated by the rotor to an elevated temperature which is less than the charring temperature of the coolant, but is sufficiently high, say around 300° F. to markedly decrease the fluid viscosity. Consequently, while the fluid conducts or transfers heat from the rotor to the stator much more readily than does a gap, it does not exert appreciable drag on the rotor, the latter then being cooled much more efficiently and at the same time not being subjected to fluid drag that would appreciably lower the efficiency of the motor.

If an evaporative type fluid coolant is utilized as described in the introduction, it will evaporate at normal operating temperatures, and the vapor bubbles will slowly escape through the clearances 48 and the ports and openings previously described, the vapor bubbles collapsing upon giving up their heat to circulating coolant in the passages 37 and 38. Thus, advantage is taken of the latent heat of vaporization of such a coolant to absorb heat from the rotor in forming vapor bubbles which then escape to be replaced by other fluid which itself is subject to vaporization, the bubbles and replacement fluid flowing in counterflow relation through the parts and openings at opposite ends of the rotor. Accordingly, the rotor then operates in vapor, which fills the gap 33, and the drag on the rotor is reduced to approximately that of air.

A typical electrical motor of the above type measures about six inches in length and three inches in diameter, will run at around 11,000 r.p.m. and will have a rated load of about 6 H.P. The complete motor will weigh around 7 lbs. The pump driven by the motor will typically deliver around 70 gal. per minute, this performance of the motor and pump indicating that a great deal of heat is generated in the rotor and stator assemblies. If the novel construction of the motor, and particularly the rotor as previously described, were not provided, the motor size and weight would have to be substantially increased, showing that the present invention results in a marked decrease of motor size and weight for given operating load and speed conditions.

I claim:

1. A vaporization cooled electrical machine, comprising means including a housing and rotor and stator assemblies within the housing, said assemblies having a gap therebetween and said housing and rotor having thin annular clearances therebetween adjacent end faces of the rotor to provide the only access to said gap, said means forming a passage containing liquid coolant for circulating said coolant within the housing and said gap containing said coolant and said coolant having a vapor pressure such that the coolant vaporizes to form bubbles in the clearances and vapor in the gap at normal operating temperatures of the machine, and said means also forming relatively restricted openings communicating between said passage and the innermost regions of said clearances for permitting limited access of liquid coolant to the clearances from said passage and escape of vapor bubbles from said clearances, whereby coolant confined in the clearances absorbs heat from the rotor and vaporizes to cool the rotor and the gap is kept filled with vapor to effect a substantial decrease in rotor drag.

2. A vaporization cooled electrical machine, comprising means including a housing and rotor and stator assemblies within the housing, said assemblies having a gap therebetween, said means forming a passage containing liquid coolant for circulating said coolant within the housing and outside said rotor and stator assemblies and said gap containing said coolant and said coolant having a vapor pressure such that the coolant vaporizes to form bubbles in the gap at normal operating temperatures of the machine, said means including a tubular rotor shaft extending within the rotor for circulating coolant in cooling relation with the rotor interior, and said means also forming a restricted opening communicating between said passage and said gap for restricting egress of liquid coolant from said gap while permitting limited access of liquid coolant to the gap from said passage and escape of vapor bubbles from the gap, whereby coolant confined in the gap absorbs heat from the rotor to cool the rotor and the temperature of said gap coolant is increased to effect a substantial decrease in the gap coolant viscosity.

3. The invention as defined in claim 2 in which said leaking seals are at axially opposite ends of said rotor assembly.

4. The invention as defined in claim 3 in which said seals comprise a pair of stationary annular carbon seals mounted by the housing.

5. The invention as defined in claim 3 including rotor shaft bearings forming with said seals annular ports communicating between said passage and said restricted openings.

6. The invention as defined in claim 5 in which a seal and bearing at each end of said rotor assembly are integral.

7. The invention as defined in claim 6 in which each integral seal and bearing comprise a sleeve coaxial with the rotor shaft and having a slot intermediate opposite ends of the sleeve and intersecting the entire sleeve bore, said slot forming said annular port.

8. The invention as defined in claim 2 including a rotary pump operatively connected with said shaft and operable to pressurize said coolant in said passage so as to keep the coolant pressure the same at said restricted openings which are at opposite ends of the rotor.

9. The invention as defined in claim 8 in which said rotor shaft is tubular and communicates with said passage and with the pump impeller for circulating coolant to the pump from said passage.

10. A vaporization cooled electrical machine, comprising means including a housing and rotor and stator assemblies within the housing, said assemblies having a gap therebetween, said means forming a passage containing liquid coolant for circulating said coolant within the housing, said gap containing said coolant and said coolant having a vapor pressure such that coolant vaporizes in the gap to substantially fill the gap with vapor at normal operating temperatures of the machine, said means also forming relatively restricted openings communicating between said passage and opposite ends of said gap for permitting limited counterflow of liquid coolant and vapor bubbles through both said openings, and pump means operable to pressurize said liquid coolant in said passage so as substantially to equalize the coolant pressure at said restricted openings thereby to maintain optimum vapor conditions in the gap characterized by said counterflow.

References Cited in the file of this patent

UNITED STATES PATENTS

| | | |
|---|---|---|
| 1,985,887 | Coberly | Jan. 1, 1935 |
| 2,686,946 | Jarsaillon | Sept. 14, 1954 |
| 2,854,594 | Philippovic | Sept. 30, 1958 |
| 2,920,219 | Beckwith | Jan. 5, 1960 |
| 2,942,555 | Pezzillo | June 28, 1960 |

UNITED STATES PATENT OFFICE

CERTIFICATE OF CORRECTION

Patent No. 3,043,968                                  July 10, 1962

Elmer F. Ward

It is hereby certified that error appears in the above numbered patent requiring correction and that the said Letters Patent should read as corrected below.

Column 4, line 52, for "forming a restricted opening" read -- including leaking seals forming restricted openings --.

Signed and sealed this 13th day of November 1962.

(SEAL)
Attest:

ERNEST W. SWIDER                                    DAVID L. LADD
Attesting Officer                                      Commissioner of Patents